Patented Sept. 7, 1954

2,688,615

UNITED STATES PATENT OFFICE 2,688,615

3-ACYLOXY-5,7-9(11)-ETIOCHOLATRIENIC ACID ADDUCTS

A Vern McIntosh, Jr., Kalamazoo, and Robert H. Levin, Kalamazoo Township, Kalamazoo County, Mich., assignors to The Upjohn Company, Kalamazoo, Mich., a corporation of Michigan No Drawing. Application February 17, 1953, Serial No. 337,436

15 Claims. (Cl. 260—239.55)

The present invention relates to certain adducts of 3-acyloxy-5,7,9(11)-etiocholatrienic acid with dienophilic anhydrides and esters, and to a process for the production thereof.

The compounds of the present invention may be represented by the structural formula:

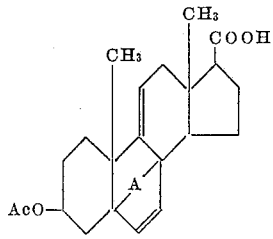

wherein Ac is selected from the group consisting of hydrogen and the acyl radical of an organic carboxylic acid, especially such acids containing from one to eight carbon atoms, inclusive; and A is an adduct radical of a dienophile selected from the group consisting of maleic acid, maleic anhydride and maleic acid diesters containing from one to eight carbon atoms, inclusive, in each of the esterifying groups.

It is an object of the present invention to provide a novel group of compounds which are useful in the preparation of steroid compounds containing an oxygen atom at carbon atom eleven. Another object of the invention is the provision of a process for the production of the novel compounds, adducts of 3-acyloxy-5,7,9(11)-etiocholatrienic acid. Other objects of the invention will be apparent to one skilled in the art to which this invention pertains.

The compounds of the present invention, as previously described in application Serial Number 269,594, filed February 1, 1952, now abandoned of which this is a continuation-in-part, are useful in the preparation of steroid compounds having an oxygen atom attached to carbon atom eleven. For example, the 9(11) double bond in these compounds can be epoxidized and the resulting 9(11)-epoxide steroid then converted to the corresponding 11-ketosteroid by the methods shown by Heymann and Fieser (J. Am. Chem. Soc. 72, 2306 (1950); ibid, 73, 5252 (1951); ibid. 74, 5938 (1952). Thus from 3-acetoxy-5,7,9(11)-etiocholatrienic acid 5,8-dimethyl maleate adduct, 3-hydroxy-11-keto-5,7-etiocholadienic acid, 5,8-maleic acid adduct is obtained. Pyrrolysis of the adduct in the manner shown by Levin, McIntosh and Spero, U. S. Patent 2,588,396, issued March 11, 1952, followed by hydrogenation results in 3-hydroxy-11-ketoetiocholanic acid and its alloisomer. Esterification with acetyl chloride gives the 3-acetoxy-11-ketoetiocholanic acid, a known compound convertible to cortisone acetate by the procedure of Sarrett, J. Biol. Chem. 162, 609 (1946). Similarly, 3-hydroxy-11-ketoetiocholanic acid can be reduced to 3,11-dihydroxyetiocholanic acid, esterified to give 3,11-diacyloxyetiocholanic acid and converted to cortisone acetate by the process of Lardon and Reichstein, Pharmaceutica Acta Helvetiae 27, 287 (1952).

Novel compounds of the present invention which are of particular interest are those compounds of the above generic formula wherein Ac is hydrogen or the acyl radical of an organic carboxylic acid containing up to and including eight carbon atoms. Among the acids which can be used are formic, acetic, propionic, butyric, valeric, hexanoic, heptanoic, octanoic, succinic, glutaric, cyclopentanoic, cyclohexanoic, benzoic, toluic, and the like. Preferred acids are the lower-aliphatic acids. The acids may also contain substituents, such as halo, alkyl, and methoxy, which are non-reactive under the reaction conditions employed. The adduct bridge (—A—) in such compounds may be represented by the graphic formula:

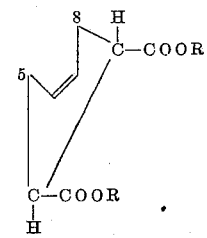

wherein R represents the organic residue of an alcohol. Such esters include the methyl, ethyl, propyl, isopropyl, butyl, isobutyl, lauryl, heptyl, octyl, cyclopentyl, cyclohexyl, benzyl, and like esters. The esterifying radical may also contain non-reactive substituents, such as halo, methoxy, or hydroxy, if desired. While the esters of the maleic acid adduct are described herein with particular reference to the methyl esters, the preferred embodiment of R is a lower-alkyl radical containing from one to eight carbon atoms, inclusive. Alternatively, the adduct radical may be depicted by the graphic formula:

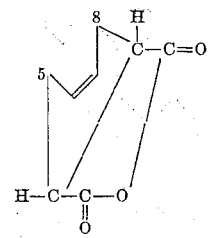

which is representative of the maleic anhydride adduct. The maleic anhydride adduct may be converted to the maleic acid adduct by reaction with a base such as, for example, sodium hydroxide, sodium carbonate, potassium hydroxide, and the like, as more fully described hereinafter.

The 3-acyloxy-5,7,9(11)-etiocholatrienic acid adducts of the present invention are conveniently prepared by the selective ozonization of an adduct of 3,20-diacyloxy-5,7,9(11),20-pregnatetraene. In carrying out the process of the present invention, the selective ozonization of an adduct of 3,20-diacyloxy-5,7,9(11),20-pregnatetraene is accomplished by dissolving the pregnatetraene adduct in a suitable solvent, cooling to about minus eighty to plus thirty degrees centigrade, and passing ozone into the solution until about 1.0 to 1.25 moles of ozone per mole of adduct have been absorbed. The temperature of the solution should be maintained below plus thirty degrees centigrade, preferably between a temperature of minus thirty and minus seventy degrees centigrade, during the addition of ozone, although temperatures as low as minus eighty and as high as plus thirty degrees centigrade are operative. The lower temperatures of the preferred range are readily obtained by cooling the solution of the adduct with a bath of solid carbon dioxide in acetone or the like, although various other methods of cooling can be used. Many of the customary solvents used in ozonizations such as chloroform, acetic acid, carbon tetrachloride, ethylene chloride, methylene chloride, and the like, can be used. Methylene chloride is the preferred solvent.

The 20:21 ozonides thus produced are then decomposed, according to the usual conditions known in the art. This can be conveniently accomplished by decomposing the ozonide in glacial acetic acid by the addition of finely-powdered zinc, or by the addition of a catalytic amount of a colloidal metal such as silver, platinum, or palladium in which latter case reductive conditions, e. g., a hydrogen atmosphere, may also be employed. Alternatively, the decomposition can be conducted using hydrogen peroxide in an organic solvent, preferably glacial acetic acid.

As is conventional with decomposition of ozonides with zinc, when the ozonizations are conducted in solvents other than glacial acetic acid, the solvent used for the ozonization is replaced, after completion of the ozonization, by adding glacial acetic acid and removing the lower-boiling solvent by fractional distillation, or the solvent can be removed by careful warming under reduced pressure prior to the addition of acetic acid, if desired. After decomposition of the 20:21 ozonide and removal of the metal, the acid can be recovered by diluting the acetic acid with water.

The starting adducts of 3,20-diacyloxy-5,7,9-(11),20-pregnatetraene have the formula:

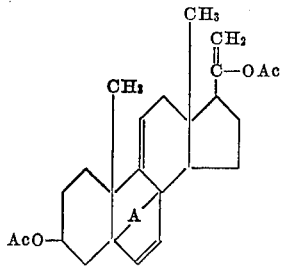

wherein A is an adduct radical of a dienophile selected from the group consisting of maleic acid, anhydride and maleic acid diesters, and wherein Ac has the value previously assigned. These compounds are conveniently prepared by heating to distillation temperature a mixture of a 3-acyloxy-5,7,9(11)-pregnatrien-20-one maleic acid, maleic acid anhydride, or maleic acid ester adduct and isopropenyl acylate in the presence of a catalytic amount of para-toluenesulfonic acid. Isopropenyl acylates which are suitable for the reaction are, for example, isopropenyl acetate, isopropenyl priopionate, isopropenyl butyrate, isopropenyl benzoate, and like isopropenyl acylates containing from one to eight carbon atoms, inclusive, in the acyloxy group, with isopropenyl acetate being preferred.

The 3 · acyloxy - 5,7,9(11)-pregnatrien-20-one adducts are prepared from ergosterol as described in U. S. Patent 2,577,777, issued December 11, 1951.

The following examples are illustrative of the process and products of the present invention but are not to be construed as limiting.

*Preparation 1.—3β,20-diacetoxy-5,7,9(11),20-pregnatetraene dimethyl maleate adduct*

Two grams of 3β-acetoxy-5,7,9(11)-pregnatrien-20-one dimethyl maleate adduct, twenty milliliters of isopropenyl acetate and 0.1 gram of para-toluenesulfonic acid were placed in a reaction flask to which was attached a short fractionating column. The mixture was heated to boiling and a mixture of acetone and isopropenyl acetate, distilling between 56 and 90 degrees centigrade, was collected over a period of about eight to about ten hours. The para-toluenesulfonic acid was neutralized by the addition of solid sodium bicarbonate and the excess isopropenyl acetate removed under reduced pressure. Cold water and methylene chloride were added with stirring to the residue. The methylene chloride layer was separated, washed with water, dried over anhydrous sodium sulfate and the solvent removed. The residue on crystallization from methanol gave 1.3 grams of 3β,20-diacetoxy-5,7,9(11),20-pregnatetraene dimethyl maleate adduct melting at 184 to 188 degrees centigrade. After crystallization from a mixture of methylene chloride and methanol followed by recrystallization from acetone the tetraene adduct melted at 196.5 to 198 degrees centigrade; $[\alpha]_D^{25.5}$ plus 86.3 degrees (chloroform).

In the same manner other 3,20-diacetoxy-5,7,9(11),20-pregnatetraene dialkyl maleate adducts are prepared from the corresponding 3-acetoxy-5,7,9(11)-pregnatrien-20-one dialkyl maleate adduct by reaction with isopropenyl acetate. Such compounds include, for example, 3,20 - diacetoxy - 5,7,9(11),20-pregnatetraene diethyl maleate adduct, 3,20-diacetoxy-5,7,9(11),20-pregnatetraene dipropyl maleate adduct, 3,20-diacetoxy-5,7,9(11),20-pregnatetraene diisopropyl maleate adduct, 3,20 - diacetoxy - 5,7,9(11),20-pregnatetraene dibutyl maleate adduct, 3,20-diacetoxy - 5,7,9(11),20 - pregnatetraene diheptyl maleate adduct, 3,20 - diacetoxy - 5,7,9(11),20-pregnatetraene dioctyl maleate adduct, 3,20-diacetoxy - 5,7,9(11),20 - pregnatetraene dicyclopentyl maleate adduct, 3,20-diacetoxy-5,7,9(11),20-pregnatetraene dicyclohexyl maleate adduct, 3,20 - diacetoxy - 5,7,9(11),20-pregnatetraene dibenzyl maleate adduct, and the like.

*Preparation 2.—3β - formoxy - 20 - acetoxy-5,7,9(11),20-pregnatetraene dimethyl maleate adduct*

Following the procedure described in Preparation 1, 3β-formoxy-5,7,9(11)-pregnatrien-20-one dimethyl maleate adduct, melting point 223 to 230 degrees centigrade, is converted to 3β-formoxy-20-acetoxy-5,7,9(11),20 - pregnatetraene dimethyl maleate adduct by reaction with isopropenyl acetate in the presence of para-toluenesulfonic acid.

*Preparation 3.—3β - benzoyloxy - 20 - acetoxy-5,7,9(11),20 - pregnatetraene dimethyl maleate adduct*

Following the procedure described in Preparation 1, 3β-benzoyloxy-5,7,9(11)-pregnatrien-20-one dimethyl maleate adduct, melting point 250 to 254 degrees centigrade, is converted to 3β-benzoyloxy - 20 - acetoxy - 5,7,9(11),20 - pregnatetraene dimethyl maleate adduct by reaction with isopropenyl acetate in the presence of para-toluenesulfonic acid.

*Preparation 4.—3β,20 - diacetoxy - 5,7,9(11),20-pregnatetraene maleic anhydride adduct*

By the procedure described in Preparation 1, 3β-acetoxy-5,7,9(11)-pregnatrien-20-one maleic anhydride adduct was allowed to react with isopropenyl acetate and para-toluenesulfonic acid to yield 3β,20 - diacetoxy - 5,7,9(11),20 - pregnatetraene maleic anhydride adduct, melting at 219 to 220.5 degrees centigrade after crystallization from a mixture of acetone and isopropyl ether.

*Preparation 5.—3β - heptanoyloxy - 20 - acetoxy-5,7,9(11),20-pregnatetraene maleic anhydride adduct*

Following the procedure described in Preparation 4, 3β-heptanoyloxy-5,7,9(11)-pregnatrien-20-one maleic anhydride adduct, melting point 170 to 171 degrees centigrade, is converted to 3β-heptanoyloxy - 20 - acetoxy - 5,7,9(11),20 - pregnatetraene maleic anhydride adduct by reaction with isopropenyl acetate in the presence of para-toluenesulfonic acid.

In essentially the same manner as described in Preparation 1 through 5, other 3,20-diacyloxy-5,7,9(11),20 - pregnatetraene maleic anhydride and dialkyl maleate adducts are prepared from the corresponding 20-keto adduct by reaction with the appropriate isopropenyl acylate. Such compounds include, for example, 3-acetoxy-20-propionoxy-5,7,9(11),20-pregnatetraene dimethyl maleate adduct, 3-acetoxy-20-benzoyloxy-5,7,9(11),20-pregnatetraene dimethyl maleate adduct, 3-butyryloxy-20-acetoxy-5,7,9(11),20-pregnatetraene dimethyl maleate adduct, 3-formoxy-20-propionoxy - 5,7,9(11),20 - pregnatetraene dimethyl maleate adduct, 3-formoxy-20-butyroyloxy-5,7,9(11),20-pregnatetraene dimethyl maleate adduct, 3 - octanolyoxy - 20 - propionyloxy-5,7,9(11),20-pregnatetraene diethyl maleate adduct, 3-benzoyloxy-20-propionoxy-5,7,9(11),20-pregnatetraene dimethyl maleate adduct, 3-benzoyloxy - 20 - butyryloxy - 5,7,9(11),20 - pregnatetraene dimethyl maleate adduct, 3,20-dibenzoyloxy-5,7,9(11),20 - pregnatetraene dimethyl maleate adduct, 3 - acetoxy - 20 - propionoxy-5,7,9(11),20-pregnatetraene maleic anhydride adduct, 3-acetoxy-20-butyryloxy-5,7,9(11),20-pregnatetraene maleic anhydride adduct, 3-acetoxy-20-benzoyloxy-5,7,9(11),20 - pregnatetraene maleic anhydride adduct, 3-propionyloxy-20-benzoyloxy-5,7,9(11),20-pregnatetraene maleic anhydride adduct, 3-heptanoyloxy-20-propionoxy-5,7,9(11),20-maleic anhydride adduct, 3-heptanoxyloxy - 20 - butyryloxy - 5,7,9(11),20 - pregnatetraene maleic anhydride adduct, 3-heptanoyloxy - 20 - benzoyloxy - 5,7,9(11),20 - pregnatetraene maleic anhydride adduct, and the like.

*Example 1.—3β - acetoxy - 5,7,9(11) - etiocholatrienic acid dimethyl maleate adduct*

A solution of 0.69 gram (1.27 millimoles) of 3β,20 - diacetoxy-5,7,9(11),20-pregnatetraene dimethyl maleate adduct in 35 milliliters of methylene chloride was cooled by a dry ice-acetone bath and ozonized oxygen was passed through the solution until 61 milligrams (17 per cent excess) of ozone was absorbed. The reaction mixture was diluted with twenty milliliters of acetic acid and concentrated under reduced pressure at below forty degrees centigrade to a volume of about ten milliliters. This was diluted with an additional 25 milliliters of acetic acid and five grams of zinc dust was added in several portions. The mixture was then filtered and the filtrate was poured into about 200 milliliters of water. The white precipitate which formed was collected and after drying weighed 0.55 grams and melted at 231 to 248 degrees centigrade. The crude 3β-acetoxy-5,7,9(11)-etiocholatrienic acid dimethyl maleate adduct thus-obtained was recrystallized first from acetone and then from methanol to give white crystals having a melting point of 255 to 259 degrees centigrade (with decomposition) and a rotation of $[\alpha]_D^{24}$ plus 80.6 degrees (chloroform).

*Analysis.*—Per cent calculated for $C_{28}H_{36}O_8$: C, 67.17, H, 7.25. Found: C, 67.16, H, 7.13.

*Neutral equivalent.*—Calculated: 501. Found: 520.

In the same manner other 3-acetoxy-5,7,9(11) - etiocholatrienic acid dialkyl maleate adducts are prepared from the corresponding 3,20-diacetoxy-5,7,9(11),20-pregnatetraene dialkyl maleate adduct by reaction with ozone and decomposition of the thus-formed ozonide. Such compounds include, for example, 3-acetoxy-5,7,9(11)-cholatrienic acid diethyl maleate adduct, 3-acetoxy-5,7,9(11)-cholatrienic acid dipropyl maleate adduct, 3-acetoxy-5,7,9(11)-cholatrienic acid diisopropyl maleate adduct, 3 - acetoxy - 5,7,9(11) - cholatrienic acid dibutyl maleate adduct, 3-acetoxy-5,7,9(11)-cholatrienic acid diheptyl maleate adduct, 3-acetoxy - 5,7,9(11) - cholatrienic acid dioctyl maleate adduct, 3-acetoxy-5,7,9(11)-cholatrienic acid dicyclopentyl maleate adduct, 3 - acetoxy - 5,7,9(11) - cholatrienic acid dicyclohexyl maleate adduct, 3 - acetoxy - 5,7,9(11)-cholatrienic acid dibenzyl maleate adduct, and the like.

*Example 2.—3β-formoxy-5,7,9(11)-etiocholatrienic acid dimethyl maleate adduct*

Following the procedure of Example 1, 3β-formoxy-5,7,9(11)-etiocholatrienic acid dimethyl maleate adduct is prepared by reaction of 3β-formoxy-20-acetoxy-5,7,9(11),20 - pregnatetraene dimethyl maleate adduct with ozone and decomposition of the thus-formed ozonide with zinc dust.

*Example 3.—3β-benzoyloxy-5,7,9(11)-etiocholatrienic acid dimethyl maleate adduct*

Following the procedure described in Example 1, 3β-benzoyloxy-5,7,9(11)-etiocholatrienic acid dimethyl maleate adduct is prepared by reaction of 3β-benzoyloxy-20-acetoxy-5,7,9(11),20 - pregnatetraene dimethyl maleate adduct with ozone and decomposition of the thus-formed ozonide with zinc dust.

*Example 4.—3β-acetoxy-5,7,9(11)-etiocholatrienic acid maleic anhydride adduct*

Following the procedure given in Example 1, 3β-acetoxy-5,7,9(11)-etiocholatrienic acid maleic anhydride adduct is prepared by reaction of 3β,20 - diacetoxy - 5,7,9(11),20 - pregnatetraene maleic anhydride adduct with ozone and decomposition of the thus-formed ozonide with zinc dust.

*Example 5.—3β-heptanoyloxy-5,7,9(11)-etiocholatrienic acid maleic anhydride adduct*

Following the procedure given in Example 1, 3β- heptanoyloxy-5,7,9(11) - etiocholatrienic acid maleic anhydride adduct is prepared by reaction of 3β-heptanoyloxy-20-propionoxy-5,7,9(11),20-pregnatetraene maleic anhydride adduct with ozone and decomposition of the thus-formed ozonide with zinc dust.

*Example 6.—3β-hydroxy-5,7,9(11)-etiocholatrienic acid maleic acid adduct*

Saponification of 3β-acetoxy-5,7,9(11)-etiocholatrienic acid maleic anhydride adduct, in dioxane solvent, at sixty degrees centigrade for thirty minutes, with an excess of sodium hydroxide, followed by acidification of the reaction mixture with dilute hydrochloric acid, gives 3β-hydroxy-5,7,9(11)-etiocholatrienic acid maleic acid aduct in a substantially quantitative yield.

In essentially the same manner as described in Examples 1 through 5, other 3-ocyloxy-5,7,9(11)-etiocholatrienic acid adducts are prepared from the corresponding tetraene adduct by reaction with ozone and decomposition of the thus-formed ozonide. Such compounds include, for example, 3-propionoxy-5,7,9(11)-etiocholatrienic acid dimethyl maleate adduct, 3-butyryloxy - 5,7,9(11)- etiocholatrienic acid dimethyl maleate adduct, 3-valeryloxy-5,7,9(11)-etiocholatrienic acid dimethyl maleate adduct, 3-hexanonoyloxy-5,7,9(11)-etiocholatrienic acid dimethyl maleate adduct, 3-heptanoyloxy-5,7,9(11)-etiocholatrienic acid dimethyl maleate adduct, 3 - octanoyloxy - 5,7,9(11) - etiocholatrienic acid diethyl maleate adduct, 3-formoxy-5,7,9(11)-etiocholatrienic acid maleic anhydride adduct, 3 - propionyloxy - 5,7,9(11) -etiocholatrienic acid maleic anhydride adduct, 3-butyryloxy-5,7,9(11) - etiocholatrienic acid maleic anhydride adduct, 3 - valeryloxy - 5,7,9(11) - etiocholatrienic acid maleic anhydride adduct, 3 - hexanoyloxy-5,7,9(11)-etiocholatrienic acid maleic anhydride adduct, 3-octanoyloxy-5,7,9(11)-etiocholatrienic acid maleic anhydride adduct, 3-benzoyloxy-5,7,9(11)-etiocholatrienic acid maleic anhydride adduct, and the like.

As stated previously (Example 6) the 3-acyloxy-5,7,9(11)-etiocholatrienic acid maleic anhydride adducts are converted to the maleic acid adducts by reaction with sodium hydroxide. If an excess of sodium hydroxide is used, in addition to conversion of the maleic anhydride adduct to the maleic acid adduct, the ester group at carbon atom three is saponified to a hydroxyl group and 3-hydroxy-5,7,9(11)-etiocholatrienic acid maleic acid adduct is obtained. By careful saponification, with a ratio of two moles of sodium hydroxide to one mole of the 3-acyloxy-5,7,9(11)-etiocholatrienic acid maleic anhydride adduct, the acyloxy group is substantially unreacted and a 3-acyloxy-5,7,9(11)-etiocholatrienic acid adduct is obtained. Similarly, mild saponification of a 3-acyloxy-5,7,9(11)-etiocholatrienic acid dimethyl maleate adduct with sodium hydroxide yields 3-hydroxy-5,7,9(11)-etiocholatrienic acid dimethyl maleate adduct.

As previously stated, the etio acid adducts of the present invention may be used to prepare the corresponding 9(11) epoxides of the formula:

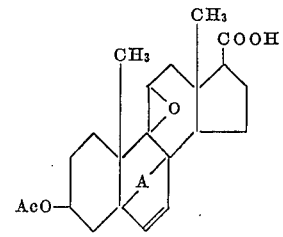

wherein A and AcO have the value previously described. These epoxides are prepared by oxidation of the corresponding 3-hydroxy or acyloxy-5,7,9(11)-etiocholatrienic acid adduct using an organic peracid or hydrogen peroxide as the oxidant. Hydrogen peroxide is usually employed in the form of a twenty to ninety per cent by weight aqueous solution, a thirty per cent solution being preferred. The reaction is carried out by stirring the adduct and oxidant together, preferably in an organic medium which is non-reactive under the reaction conditions. Suitable media include chloroform, carbon tetrachloride, mixtures of ether and chloroform, glacial acetic acid, and many others. The ratio of oxygen-furnishing agent to steroid can be varied considerably within broad ranges. Ratios of up to twenty moles to one are operative, but ratios of from two to eight moles per mole of steroid are preferred for attainment of optimum yields, the exact ratio being preferably varied inversely with the reaction time desired to be employed. The temperature of the mixture is usually maintained at from about zero degrees to about 100 degrees centigrade for a suitable period, e. g., from about one-half to twenty-four hours, depending on the concentration of oxygen-furnishing agent, and the 9(11)-oxido compound then isolated in any convenient manner, such as by volatilizing the reaction medium, extracting the residue with chloroform, volatilizing the chloroform, and recrystallizing the residue from an organic solvent. Alternatively, the compounds may be recovered by pouring the reaction product into water, filtering the solution, and drying the precipitate. A convenient reaction medium when the oxidant is hydrogen peroxide is glacial acetic acid.

Alternatively, the re-acyloxy-9(11)-oxido-5,7-etiocholadienic acid adducts can be prepared from the corresponding 20-enol acylate adducts represented by the formula:

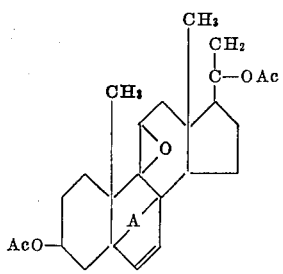

wherein A and Ac have the value previously described, by ozonization of the 20:21 double bond according to the process of the present invention. Such starting adducts are prepared according to the method disclosed in the co-pending application of Moffett, Serial No. 207,829, filed January 25, 1951, now Patent No. 2,595,596, from the corresponding 20-keto adducts and the appropriate isopropenyl acylate.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A 3-acyloxy-5,7,9(11)-etiocholatrienic acid adduct represented by the formula:

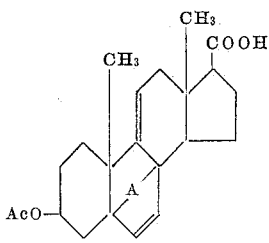

wherein Ac is selected from the group consisting of hydrogen and the acyl radical of an unsubstituted organic mono-carboxylic hydrocarbon acid containing from one to eight carbon atoms, inclusive, and wherein A is the adduct radical of a dienophile selected from the group consisting of maleic acid, maleic anhydride, and maleic acid lower-alkyl diesters.

2. 3 - acetoxy - 5,7,9(11)-etiocholatrienic acid 5,8-dimethyl maleate adduct.

3. 3-formoxy - 5,7,9(11) - etiocholatrienic acid 5,8-dimethyl maleate adduct.

4. 3-benzoyloxy-5,7,9(11)-etiocholatrienic acid 5,8-dimethyl maleate adduct.

5. 3 - acetoxy - 5,7,9(11)-etiocholatrienic acid 5,8-maleic anhydride adduct.

6. 3 - heptanoyloxy - 5,7,9(11) - etiocholatrienic acid 5,8-maleic anhydride adduct.

7. Process for the production of a 3-acyloxy-5,7,9(11)-etiocholatrienic acid adduct which includes the step of ozonizing the 20:21 double bond in a 3,20-diacyloxy-5,7,9(11),20-pregnatetraene adduct of the formula:

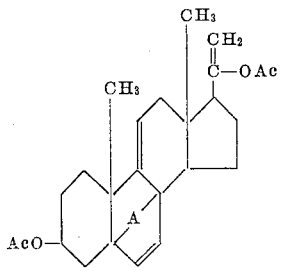

wherein Ac is the acyl radical of an organic carboxylic acid containing from one to eight carbon atoms, inclusive, and wherein A is the adduct radical of a dienophile selected from the group consisting of maleic anhydride and maleic acid diesters wherein the esterifying groups each contain from one to eight carbon atoms, inclusive, with from about 1.0 to about 1.25 moles of ozone per mole of starting pregnatetraene adduct, in an organic solvent for the reaction, at a temperature between about minus eighty and plus thirty degrees centigrade, decomposing the ozonide and isolating the 3-acyloxy-5,7,9(11)-etiocholatrienic acid adduct from the reaction product.

8. Process for the production of a 3-acyloxy-5,7,9(11)-etiocholatrienic acid adduct which includes the step of ozonizing the 20:21 double bond in a 3-acyloxy-20 - acetoxy - 5,7,9(11),20-pregnatetraene adduct of the formula:

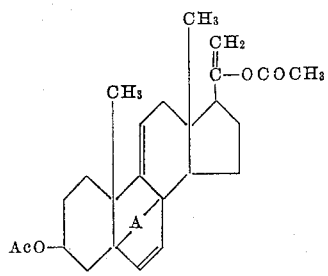

wherein Ac is the acyl radical of an organic carboxylic acid containing from one to eight carbon atoms, inclusive, and wherein A is the adduct radical of a dienophile selected from the group consisting of maleic anhydride and maleic acid diesters wherein the esterifying groups each contain from one to eight carbon atoms, inclusive, with from about 1.0 to about 1.25 moles of ozone per mole of starting pregnatetraene adduct, in an organic solvent for the reaction, at a temperature between about minus eighty and plus thirty degrees centigrade, decomposing the ozonide and isolating the 3-acyloxy-5,7,9(11)-etiocholatrienic acid adduct from the reaction product.

9. Process for the production of a 3-acyloxy-5,7,9(11)-etiocholatrienic acid adduct which includes the step of ozonizing the 20:21 double bond in a 3-acyloxy-20-acetoxy-5,7,9(11),20-pregnatetraene adduct of the formula:

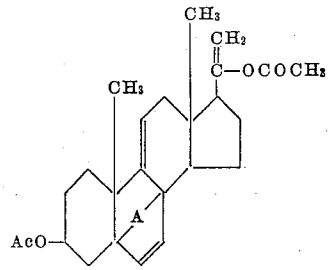

wherein Ac is the acyl radical of an organic carboxylic acid containing from one to eight carbon atoms, inclusive, and wherein A is the adduct radical of a dienophile selected from the group consisting of maleic anhydride and maleic acid diesters wherein the esterifying groups each contain from one to eight carbon atoms, inclusive, with from about 1.0 to about 1.25 moles of ozone per mole of starting pregnatetraene adduct, in methylene chloride solvent, at a temperature between about minus eighty and plus thirty degrees centigrade, decomposing the ozonide and isolating the 3-acyloxy-5,7,9(11)-etiocholatrienic acid 5,8-adduct from the reaction product.

10. Process for the production of a 3-acyloxy-5,7,9(11)-etiocholatrienic acid adduct which includes the step of ozonizing the 20:21 double bond in a 3-acyloxy-20-acetoxy-5,7,9(11),20-pregnatetraene adduct of the formula:

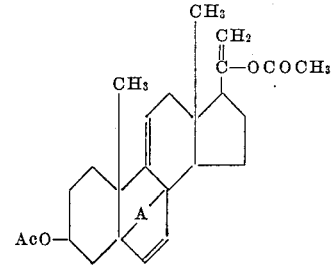

wherein Ac is the acyl radical of an organic carboxylic acid containing from one to eight carbon atoms, inclusive, and wherein A is the adduct radical of a dienophile selected from the group consisting of maleic anhydride and maleic acid diesters wherein the esterifying groups each contain from one to eight carbon atoms, inclusive, with from about 1.0 to about 1.25 moles of ozone per mole of starting pregnatetraene adduct, in methylene chloride solvent, at a temperature between about minus eighty and plus thirty degrees centigrade, decomposing the ozonide with zinc in acetic acid, and isolating the 3-acyloxy-5,7,9(11)-etiocholatrienic acid 5,8-adduct from the reaction product.

11. Process for the production of 3-acetoxy-5,7,9(11) - etiocholatrienic acid 5,8 - dimethyl maleate adduct which includes the step of ozonizing the 20:01 double bond in 3,20-diacetoxy-5,7,9(11),20-pregnatetraene 5,8-dimethyl maleate adduct with from about 1.0 to about 1.25 moles of ozone per mole of starting pregnatetraene adduct, in methylene chloride solvent, at a temperature between about minus eighty and plus thirty degrees centigrade, decomposing the ozonide with zinc in acetic acid, and isolating the 3-acetoxy-5,7,9(11) - etiocholatrienic acid 5,8-dimethyl maleate adduct from the reaction product.

12. Process for the production of 3-formoxy-5,7,9(11))-etiocholatrienic acid 5,8-dimethyl maleate adduct which includes the step of ozonizing the 20:21 double bond in 3-formoxy-20-acetoxy-5,7,9(11),20 -- pregnatetraene 5,8 - dimethyl maleate adduct with from about 1.0 to about 1.25 moles of ozone per mole of starting pregnatetraene adduct, in methylene chloride solvent, at a temperature between about minus eighty and plus thirty degrees centigrade, decomposing the ozonide with zinc in acetic acid, and isolating the 3-formoxy - 5,7,9(11) - etiocholatrienic acid 5,8-dimethyl maleate adduct from the reaction product.

13. Process for the production of 3 - benzoyloxy - 5,7,9(11) - etiocholatrienic acid 5,8 - dimethyl maleate adduct which includes the step of ozonizing the 20:21 double bond in 3-benzoyloxy-20-acetoxy-5,7,9(11),20-pregnatetraene 5,8-dimethyl maleate adduct with from about 1.0 to about 1.25 moles of ozone per mole of starting pregnatetraene adduct, in methylene chloride solvent, at a temperature between about minus eighty and plus thirty degrees centigrade, decomposing the ozonide with zinc in acetic acid, and isolating the 3-benzoyloxy-5,7,9(11)-etiocholatrienic acid 5,8-dimethyl maleate adduct from the reaction product.

14. Process for the production of 3-acetoxy-5,7,9(11) - etiocholatrienic acid 5,8 - maleic anhydride adduct which includes the step of ozonizing the 20:21 double bond in 3,20-diacetoxy-5,7,9(11),20 - pregnatetraene 5,8 - maleic anhydride adduct with from about 1.0 to about 1.25 moles of ozone per mole of starting pregnatetraene adduct, in methylene chloride solvent, at a temperature between about minus eighty and plus thirty degrees centigrade, decomposing the ozonide with zinc in acetic acid, and isolating the 3-acetoxy-5,7,9(11) - etiocholatrienic acid 5,8-maleic anhydride adduct from the reaction product.

15. Process for the production of 3-heptanoyloxy-5,7,9(11) - etiocholatrienic acid 5,8-maleic anhydride adduct which includes the step of ozonizing the 20:21 double bond in 3-heptanoyloxy-20-propionoxy - 5,7,9(11),20 - pregnatetraene 5,8-maleic anhydride adduct with from about 1.0 to about 1.25 moles of ozone per mole of starting pregnatetraene adduct, in methylene chloride solvent, at a temperature between about minus eighty and plus thirty degrees centigrade, decomposing the ozonide with zinc in acetic acid, and isolating the 3 - heptanoyloxy - 5,7,9(11) - etiocholatrienic acid 5,8 - maleic anhydride adduct from the reaction product.

No references cited